Patented Sept. 14, 1943

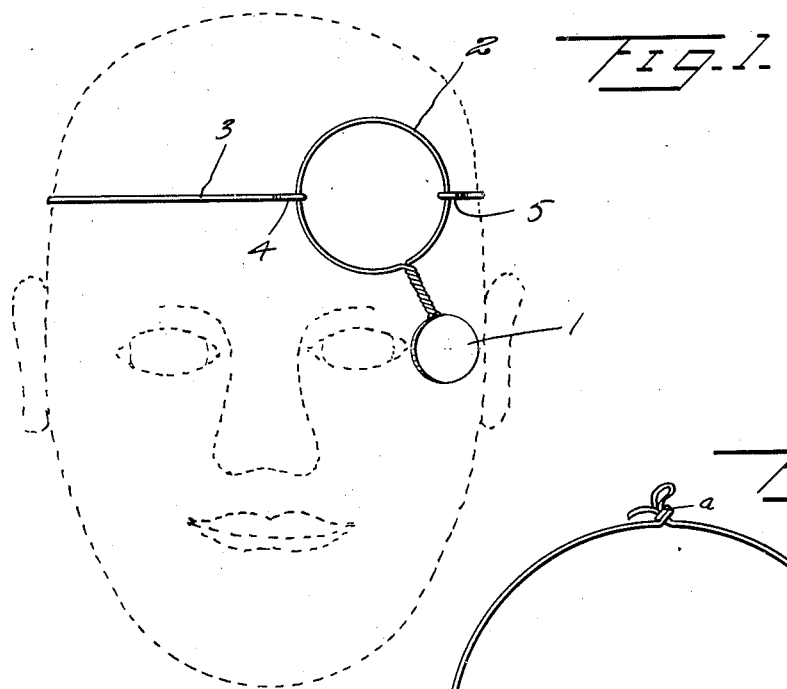
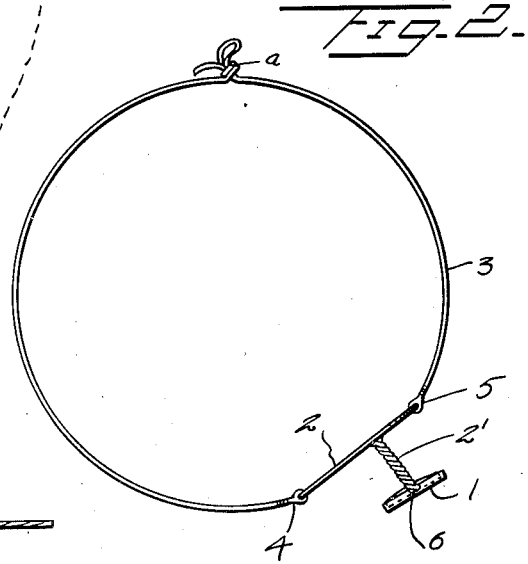
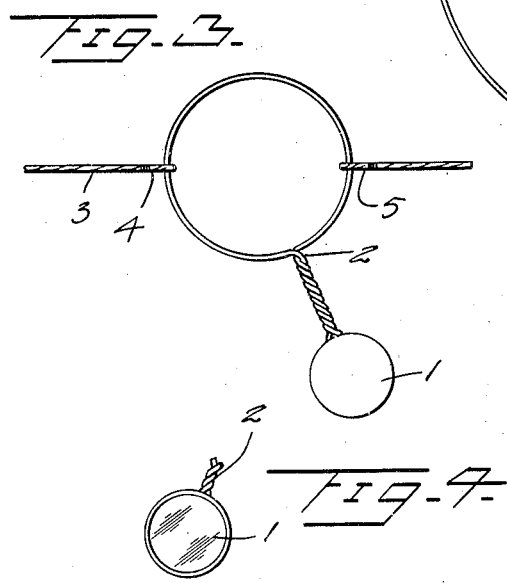

2,329,416

UNITED STATES PATENT OFFICE 2,329,416

REARVIEW MIRROR FOR CYCLISTS

Walter Henderson Pace, Texarkana, Tex.

Application June 19, 1942, Serial No. 447,717

1 Claim. (Cl. 88—101)

This invention relates to new and useful improvements in rear-view mirrors for cyclists.

The primary object of my invention is to provide a rear-view mirror of the character specified that may be fastened to the user's head instead of to the bicycle or motor-cycle, thus eliminating vibration and the usual breakage to rear-view mirrors when fastened to the wheel frame.

A further object of my invention is to provide a rear-view mirror for cyclists that is simple and economical in construction and so compact that it may be conveniently carried in the vest pocket or purse when not in use.

Still another object of my invention is to provide a mirror of the character specified that may be readily adjusted to the vision and is highly practical and efficient in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a front view, illustrating the application of my invention.

Figure 2 is a plan view of the rear-view mirror per se.

Figure 3 is an enlarged detail fragmentary sectional view of the mirror, wire supporting frame and associated parts and Figure 4 is a detail view.

Referring to the drawing for a more particular description of my invention, and in which drawing like parts are designated by like reference characters throughout the several views, the numeral 1 designates the rear-view mirror per se, which is relatively small in size and carried by the circular wire supporting frame 2. The frame 2 is fastened to the head of the user by the cords or other flexible elements 3, which extend around the fore-head and are connected at their front ends, as at 4 and 5, to opposite sides of the frame 2. The free ends of the cords are tied together at the back, as at $a$, and hence, the cords are therefore readily adjustable for head-size.

The wire frame 2 fits over one eye, as shown, and the ends of the wire are twisted together to form the shank 2', which extends outwardly and downwardly from the bottom edge of the loop at the desired angle and inclination with its free end soldered or otherwise secured, as at 6, to the frame of the mirror.

The wire frame 2 is fitted to the fore-head in such a manner as to place the mirror just outside the line of vision while the wearer is looking directly forward and at the same time permit sufficient rear vision. The shank 2' of the wire frame permits the mirror to be adjusted to the exact angle and position to best suit the profile of the individual user.

With the use of my mirror, objects may be distinguished ahead, while at the same time observed behind, without turning the head.

The device may be worn over the right or left eye, depending on the preference of the user, and the scope of vision will be equal to that of the ordinary rear-view mirror of an automobile.

From the foregoing description taken in connection with the drawing, it is thought that the construction, operation and advantages of my invention will be readily understood, without requiring a more extended explanation.

Having described my invention, what I claim as new and desire to secure by Letters Patent, is:

A device of the character specified, comprising a rear-view mirror, a circular wire supporting frame for the mirror and cords connected at their front ends to opposite sides of said supporting frame and adapted to be tied together at the back for fastening the latter to the fore-head of the user.

WALTER HENDERSON PACE.